US011893812B2

United States Patent
Hirota et al.

(10) Patent No.: US 11,893,812 B2
(45) Date of Patent: Feb. 6, 2024

(54) VEHICLE DISPLAY DEVICE, VEHICLE DISPLAY SYSTEM, VEHICLE DISPLAY METHOD, AND NON-TRANSITORY STORAGE MEDIUM STORED WITH PROGRAM

(71) Applicant: TOYOTA JIDOSHA KABUSHIKI KAISHA, Toyota (JP)

(72) Inventors: Takahiro Hirota, Nukata-gun (JP); Yuting Zhang, Toyota (JP); Junichi Todaka, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/661,409

(22) Filed: Apr. 29, 2022

(65) Prior Publication Data

US 2022/0392238 A1   Dec. 8, 2022

(30) Foreign Application Priority Data

Jun. 4, 2021 (JP) ................................. 2021-094283

(51) Int. Cl.
*G06V 20/70* (2022.01)
*G06V 20/58* (2022.01)
*B60K 35/00* (2006.01)

(52) U.S. Cl.
CPC .............. *G06V 20/70* (2022.01); *B60K 35/00* (2013.01); *G06V 20/58* (2022.01); *B60K 2370/1529* (2019.05)

(58) Field of Classification Search
CPC ........ G06V 20/70; G06V 20/58; B60K 53/00; B60K 2370/1529
See application file for complete search history.

(56) References Cited

U.S. PATENT DOCUMENTS

| 6,327,522 B1 * | 12/2001 | Kojima ................. B60K 35/00 701/1 |
| 8,810,381 B2 * | 8/2014 | Fong ...................... G02B 27/01 340/436 |
| 2012/0314074 A1 | 12/2012 | Aimura et al. |
| 2014/0019005 A1 * | 1/2014 | Lee ....................... G08G 1/0962 701/301 |
| 2016/0057354 A1 | 2/2016 | Shigemura |

(Continued)

FOREIGN PATENT DOCUMENTS

| JP | 2009-248721 A | 10/2009 |
| JP | 2014-192770 A | 10/2014 |

(Continued)

*Primary Examiner* — Christopher E Leiby
(74) *Attorney, Agent, or Firm* — Oblon, McClelland, Maier & Neustadt, L.L.P.

(57) ABSTRACT

A vehicle display device includes: an obstacle information acquisition section configured to acquire information relating to a plurality of obstacles in surroundings of a vehicle; and a mark display section configured to display a predetermined individual mark prompting caution toward an individual obstacle among the plurality of obstacles by superimposed display in a display region inside a vehicle cabin, and to display a predetermined cluster mark prompting caution toward a plurality of the obstacles by superimposed display in the display region in a case in which a predetermined condition has been satisfied.

10 Claims, 8 Drawing Sheets

(56) References Cited

U.S. PATENT DOCUMENTS

| | | | |
|---|---|---|---|
| 2016/0086042 A1* | 3/2016 | Enz | G06T 11/00 |
| | | | 348/148 |
| 2017/0225617 A1* | 8/2017 | Morimura | G06V 40/10 |
| 2018/0024354 A1* | 1/2018 | Shibata | B60W 30/12 |
| | | | 345/7 |
| 2018/0170257 A1* | 6/2018 | Ohta | B60Q 9/008 |
| 2020/0130580 A1* | 4/2020 | Yasue | G06V 40/193 |
| 2020/0148105 A1* | 5/2020 | Hiraiwa | B60W 50/14 |
| 2020/0148203 A1* | 5/2020 | Taniguchi | G06T 1/00 |
| 2020/0284605 A1* | 9/2020 | Sakai | G01C 21/10 |
| 2022/0118916 A1* | 4/2022 | Kang | B60R 11/04 |
| 2022/0324387 A1* | 10/2022 | Hirohata | B60R 1/27 |

FOREIGN PATENT DOCUMENTS

| | | |
|---|---|---|
| JP | 2019-113809 A | 7/2019 |
| WO | 2011/108218 A1 | 9/2011 |

\* cited by examiner

VEHICLE DISPLAY DEVICE, VEHICLE DISPLAY SYSTEM, VEHICLE DISPLAY METHOD, AND NON-TRANSITORY STORAGE MEDIUM STORED WITH PROGRAM

CROSS-REFERENCE TO RELATED APPLICATION

This application is based on and claims priority under 35 USC 119 from Japanese Patent Application No. 2021-094283 filed on Jun. 4, 2021, the disclosure of which is incorporated by reference herein.

BACKGROUND

Technical Field

The present disclosure relates to a vehicle display device, a vehicle display system, a vehicle display method, and a non-transitory storage medium stored with a program.

Related Art

Japanese Patent Application Laid-Open (JP-A) No. 2009-248721 discloses technology in which a virtual image is displayed superimposed on a field of view of a driver using a head-up display device. In JP-A No. 2009-248721, a frame-shaped display image is displayed in a case in which an obstacle is clearly visible to the driver, whereas a display image representing the obstacle is displayed at the position of the obstacle in a case in which the obstacle is less visible to the driver.

However, in a case in which there are a large number of obstacles, the obstacles might instead become more difficult for the driver to see if display images (marks) were displayed for all the obstacles.

SUMMARY

The present disclosure provides a vehicle display device, a vehicle display system, a vehicle display method, and a non-transitory storage medium stored with a program that are capable of making a driver aware of obstacles in a suitable manner, even in a case in which there are a large number of obstacles.

A first aspect of the present disclosure is a vehicle display device including: an obstacle information acquisition section configured to acquire information relating to a plurality of obstacles in surroundings of a vehicle; and a mark display section configured to display a predetermined individual mark prompting caution toward an individual obstacle among the plurality of obstacles by superimposed display in a display region inside a vehicle cabin, and to display a predetermined cluster mark prompting caution toward a plurality of the obstacles by superimposed display in the display region in a case in which a predetermined condition has been satisfied.

In the vehicle display device of the first aspect, the information relating to plural obstacles in the vehicle surroundings is acquired by the obstacle information acquisition section. The mark display section displays the predetermined individual mark superimposed in the display region inside the vehicle cabin. Furthermore, the mark display section performs superimposed display of the predetermined cluster mark in a case in which the predetermined condition has been satisfied. Note that the individual mark is a mark for prompting caution toward an individual obstacle, whereas the cluster mark is a mark for prompting caution toward plural obstacles. A driver may be prompted to take caution with respect to obstacles in the vehicle surroundings using the individual mark and the cluster mark.

Moreover, selecting to display the cluster mark rather than the individual mark in a case in which the predetermined condition has been satisfied enables any difficulty seeing the obstacles from the perspective of the driver to be suppressed, even in a case in which there are a large number of obstacles. Note that "superimposed display" referred to here is not limited to configurations in which superimposed display is performed on obstacles viewed through windshield glass, and is a broad concept including configurations in which superimposed display is performed on images of obstacles displayed on a display or the like inside the vehicle cabin.

In a second aspect of the present disclosure, in the first aspect, the mark display section may be configured to display the cluster mark in a case in which the plurality of obstacles are close together based on information acquired by the obstacle information acquisition section.

In the vehicle display device of the second aspect, displaying the cluster mark for the plural obstacles that are close together enables the driver to be made aware of these plural obstacles that are close together as an assembled cluster of obstacles.

In a third aspect of the present disclosure, in the first aspect or the second aspect, the mark display section may be configured to display the individual mark in a case in which a distance between the individual obstacle and the vehicle is a predetermined value or below.

In the vehicle display device of the third aspect, displaying the individual mark for the obstacle at a close distance from the vehicle enables the driver to be made aware of this obstacle that requires more caution, even in a case in which there are a large number of obstacles.

In a fourth aspect of the present disclosure, in any one of the first aspect to the third aspect, the mark display section may be configured to display the individual mark in a case in which the individual obstacle is walking or traveling toward the vehicle.

In the vehicle display device of the fourth aspect, displaying the individual mark for the obstacle such as a pedestrian walking toward the vehicle or a bicycle traveling toward the vehicle enables the driver to be made aware of this obstacle that requires more caution, even in a case in which there are a large number of obstacles.

In a fifth aspect of the present disclosure, in any one of the first aspect to the fourth aspect, the mark display section may be configured to display the cluster mark in a case in which a number of the obstacles is a predetermined value or above.

In the vehicle display device of the fifth aspect, the cluster mark is displayed in a case in which the number of obstacles is the predetermined value or above, thereby enabling the driver to be rapidly made aware that there are a large number of obstacles.

A sixth aspect of the present disclosure is a vehicle display system including: the vehicle display device of any one of claim 1 to claim 5; and a display section that is provided inside the vehicle cabin and that includes the display region in which at least one of the individual mark or the cluster mark is displayed by the mark display section.

In the vehicle display system of the sixth aspect, at least one of the individual mark or the cluster mark is displayed in the display region inside the vehicle cabin by the mark display section of the vehicle display device. This enables the driver to ascertain information regarding the obstacles by looking at the display region.

In a seventh aspect of the present disclosure, in the sixth aspect, the display region is configured including a region where an image is projected in front of a gaze of a driver using a head-up display device; and the mark display section is configured to display at least one of the individual mark or the cluster mark superimposed on the corresponding obstacle.

In the vehicle display system of the seventh aspect, at least one of the individual mark or the cluster mark is displayed superimposed on the corresponding obstacle in front in a state in which the gaze of the driver is directed toward the front. This enables the driver to be made aware of information regarding obstacles without shifting their gaze during driving.

In an eighth aspect of the present disclosure, in the sixth aspect, the display region is configured including a display provided at an instrument panel; and the mark display section is configured to display on the display at least one of the individual mark or the cluster mark together with an image of the corresponding obstacle.

In the vehicle display system of the eighth aspect, at least one of the individual mark or the cluster mark is displayed superimposed on the display provided at the instrument panel. This enables any irritation felt by the driver toward the individual mark or cluster mark in a state in which their gaze is directed toward the front to be lessened compared to configurations in which the mark is displayed superimposed on the actual obstacle.

A ninth aspect of the present disclosure is a vehicle display method including: acquiring information relating to a plurality of obstacles in surroundings of a vehicle; and or the plurality of obstacles, displaying, on a display region inside a vehicle cabin, at least one of a predetermined individual mark prompting caution toward an individual obstacle among the plurality of obstacles or a predetermined cluster mark prompting caution toward a plurality of the obstacles.

A tenth aspect of the present disclosure is a non-transitory storage medium storing a program executable by a computer to perform processing including: acquiring information relating to a plurality of obstacles in surroundings of a vehicle; and for the plurality of obstacles, displaying, on a display region inside a vehicle cabin, at least one of a predetermined individual mark prompting caution toward an individual obstacle among the plurality of obstacles or a predetermined cluster mark prompting caution toward a plurality of the obstacles.

The vehicle display device, the vehicle display system, the vehicle display method, and the non-transitory storage medium stored with a program of the present disclosure enable the driver to be made aware of obstacles in a suitable manner.

BRIEF DESCRIPTION OF THE DRAWINGS

Exemplary embodiments of the present disclosure will be described in detail based on the following figures, wherein.

DETAILED DESCRIPTION

Explanation follows regarding a vehicle display system 10 according to an exemplary embodiment, with reference to the drawings. Note that in FIG. 1, the arrow UP indicates a vehicle vertical direction upper side and the arrow RH indicates a vehicle width direction right side. In the following explanation, references to vertical direction and left-right direction respectively refer to up and down in the vehicle vertical direction and left and right in the vehicle width direction.

Figure 1:
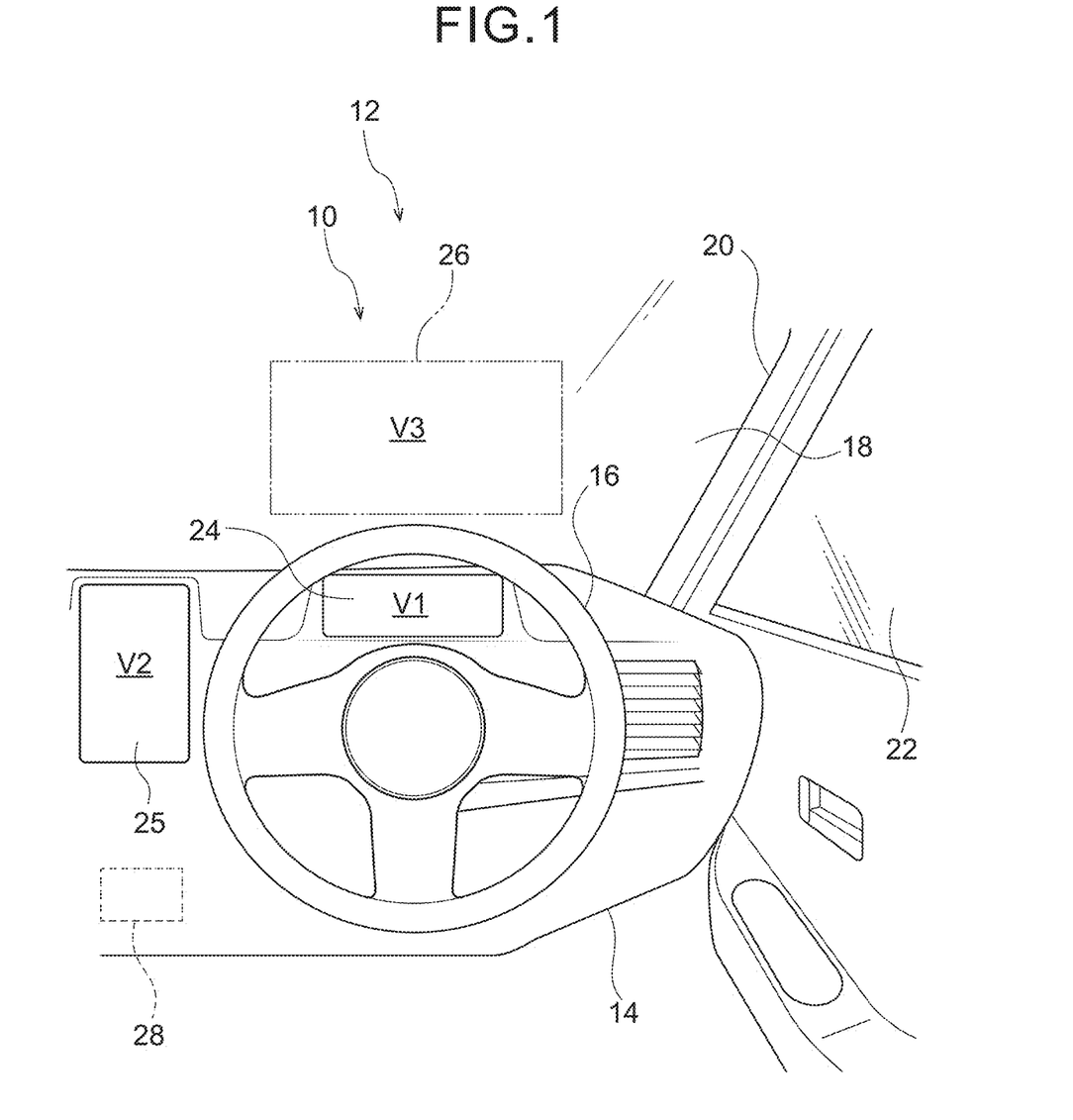
FIG. 1 is a schematic view illustrating a front section inside a vehicle cabin of a vehicle applied with a vehicle display system according to an exemplary embodiment, as viewed from a vehicle rear side.

As illustrated in FIG. 1, an instrument panel 14 is provided to a front section inside a vehicle cabin of a vehicle 12. The instrument panel 14 extends along the vehicle width direction. A steering wheel 16 is provided on the vehicle right side of the instrument panel 14. Namely, in the present exemplary embodiment as an example, the vehicle is a right-hand drive vehicle in which the steering wheel 16 is provided on the right side and a driving seat is set on the vehicle right side.

Windshield glass 18 is provided at a front end portion of the instrument panel 14. The windshield glass 18 extends along the vehicle vertical direction and the vehicle width direction so as to partition between the vehicle cabin interior and the vehicle cabin exterior.

A vehicle right end portion of the windshield glass 18 is fixed to a front pillar 20 on the vehicle right side. The front pillar 20 extends along the vehicle vertical direction, and the windshield glass 18 is fixed to a vehicle width direction inner end portion of the front pillar 20. A front end portion of front side glass 22 is fixed to a vehicle width direction outer end portion of the front pillar 20. Note that a vehicle left end portion of the windshield glass 18 is fixed to a non-illustrated front pillar on the vehicle left side.

A first display section 24 including an image display region V1 is provided to the instrument panel 14. The first display section 24 is configured by a meter display provided at the vehicle front side of the driving seat and on the vehicle right side of the instrument panel 14. The first display section 24 is connected to various meter equipment installed to the vehicle 12, and is provided at a position that falls within the field of view of a driver in a state in which the driver is directing their gaze toward the vehicle front side.

A second display section 25 including an image display region V2 is provided to the instrument panel 14. The second display section 25 is configured by a center display installed at a vehicle width direction central portion of the instrument panel 14.

A third display section 26 including an image display region V3 is provided to the windshield glass 18. The third display section 26 is set at the vehicle upper side of the first display section 24, and is configured by a projection surface that a head-up display device 44 (see FIG. 2) projects onto. Specifically, the head-up display device 44 is provided at the vehicle front side of the instrument panel 14, and an image from the head-up display device 44 is projected onto the third display section 26 of the windshield glass 18. Namely, the third display section 26 is a part of the windshield glass 18 configuring the projection surface of the head-up display device 44.

Note that a vehicle display device 28 configuring the vehicle display system 10 is provided to the vehicle 12. The vehicle display device 28 of the present exemplary embodiment is for example an electronic control unit (ECU) that performs various control.

Hardware Configuration of Vehicle Display Device 28

Figure 2:
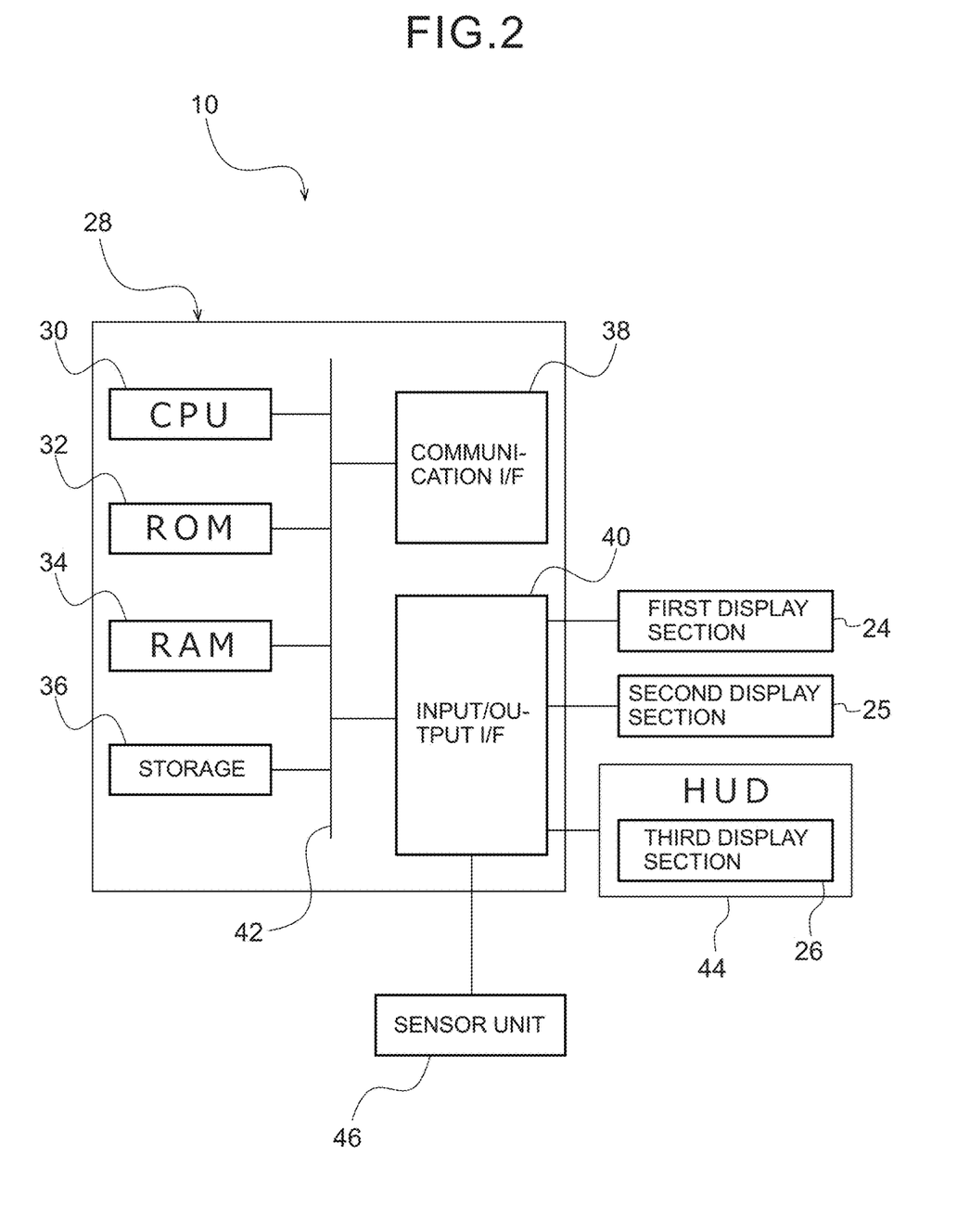
FIG. 2 is a block diagram illustrating a hardware configuration of a vehicle display device according to an exemplary embodiment.

As illustrated in FIG. 2, the vehicle display device 28 is configured including a central processing unit (CPU: processor) 30, read only memory (ROM) 32, random access memory (RAM) 34, storage 36, a communication interface (I/F) 38, and an input/output interface (I/F) 40. The respective configuration is connected together so as to be capable of communicating with each other through an internal bus 42.

The CPU 30 is a central processing unit that executes various programs and controls various sections. Namely, the CPU 30 reads a program from the ROM 32 or the storage 36, and executes the program using the RAM 34 as a workspace. The CPU 30 controls the above-mentioned configuration and performs various computation processing based on the programs recorded in the ROM 32 or the storage 36.

The ROM 32 holds various programs and various data. The RAM 34 acts as a workspace to temporarily store programs or data. The storage 36 is a non-transitory storage medium configured by a hard disk drive (HDD) or a solid-state drive (SSD), and holds various programs including an operating system, as well as various data. In the present exemplary embodiment, a display program and so on for performing display processing are held in the ROM 32 or the storage 36. Various input/output devices are connected to the communication interface 38.

The first display section 24, the second display section 25, the head-up display device 44, and a sensor unit 46 are connected to the input/output interface 40. Images are projected onto the third display section 26 using the head-up display device 44.

The sensor unit 46 includes plural sensors from amongst various sensors such as a camera, radar, light detection and ranging (or laser imaging detection and ranging: LIDAR), and a global positioning system (GPS) sensor. The camera images the surroundings of the vehicle 12. In the present exemplary embodiment, the camera is configured including at least a front camera that images ahead of the vehicle.

The radar uses radio waves to detect distance and direction of objects in the surroundings of the vehicle 12. The LIDAR uses laser beams to detect distance and direction of objects in the surroundings of the vehicle 12. The GPS sensor detects the current position of the vehicle 12. The sensor unit 46 is also configured including other sensors, such as a sensor that detects a gaze point of the occupant.

Functional Configuration of Vehicle Display Device 28

The vehicle display device 28 realizes various functionality using the above-described hardware resources. Explanation follows regarding the functional configuration realized by the vehicle display device 28, with reference to FIG. 3.

Figure 3:
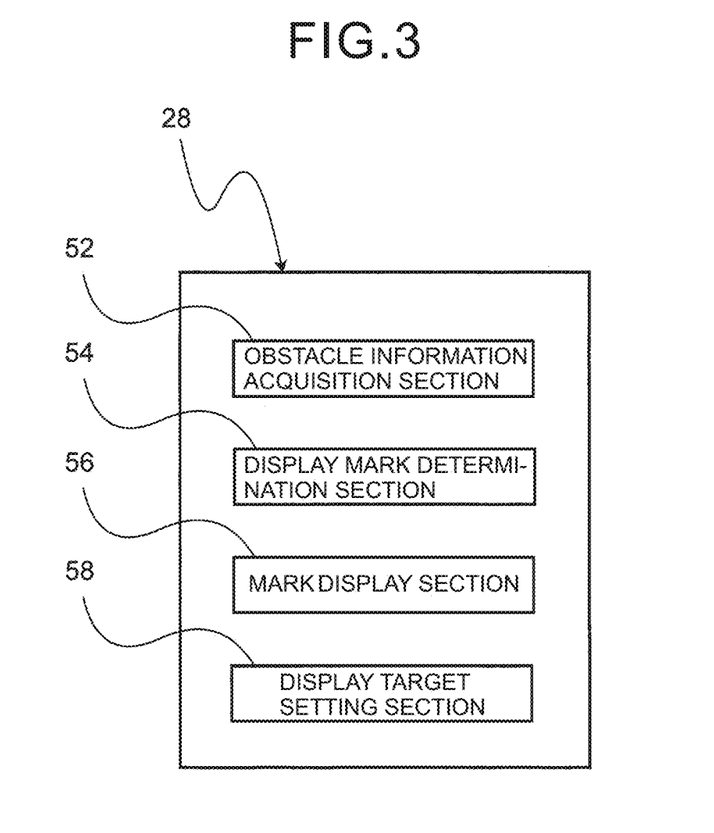
FIG. 3 is a block diagram illustrating a functional configuration of a vehicle display device according to an exemplary embodiment.

As illustrated in FIG. 3, the vehicle display device 28 is configured including an obstacle information acquisition section 52, a display mark determination section 54, a mark display section 56, and a display target setting section 58 as functional configuration. Note that the respective functional configuration is realized by the CPU 30 reading and executing the corresponding program stored in the ROM 32 or the storage 36.

The obstacle information acquisition section 52 acquires information relating to plural obstacles in the vehicle surroundings. Specifically, the obstacle information acquisition section 52 acquires information regarding obstacles as detected by the sensor unit 46. For example, the obstacle information acquisition section 52 acquires captured image data of ahead of the vehicle captured by the front camera. The obstacle information acquisition section 52 also acquires data relating to the positions of the respective obstacles as detected by the radar, LIDAR, or the like.

The display mark determination section 54 determines whether or not to display a mark based on the obstacle data acquired by the obstacle information acquisition section 52. In a case in which a mark is to be displayed, the display mark determination section 54 determines whether to display an individual mark prompting caution toward an individual obstacle, or to display a cluster mark prompting caution toward plural obstacles. The individual mark and cluster mark are described in detail below.

In the present exemplary embodiment as an example, the display mark determination section 54 displays a mark in a case in which an obstacle is a particular type and a distance between the obstacle and the vehicle 12 is closer than a predetermined distance. For example, the display mark determination section 54 may determine to display a mark in a case in which the obstacle is a pedestrian or a two-wheeled vehicle. In the present exemplary embodiment as an example, the display mark determination section 54 determines whether or not to display a mark for obstacles ahead of the vehicle.

Note that in a case in which the number of obstacles is a predetermined value or above based on the information acquired by the obstacle information acquisition section 52, the display mark determination section 54 determines to display the cluster mark. For example, the display region may be divided into three equal sub-regions, and the display mark determination section 54 determine to display the cluster mark in a case in which the number of obstacles in any of the sub-regions is five or above.

Furthermore, the display mark determination section 54 determines to display the cluster mark in a case in which plural obstacles are close together, even if the number of obstacles is less than the predetermined value. For example, the display mark determination section 54 determines to display the cluster mark in a case in which parts of obstacles ahead of the vehicle appear to overlap one another from the perspective of the driver. Namely, in a case in which a boundary between obstacles cannot be identified during image analysis of the image data captured by the front camera, these parts of obstacles ahead of the vehicle appear to overlap one another from the perspective of the driver, and so a determination is made to display the cluster mark.

On the other hand, the display mark determination section 54 determines to display the individual mark for an obstacle in a case in which the distance between the vehicle 12 and the obstacle as detected using the radar, LIDAR, or the like is a predetermined value or below. The display mark determination section 54 also determines to display the individual mark for an obstacle that is walking or traveling toward the vehicle 12. Namely, a relative speed of the obstacle with respect to the vehicle 12 is computed from the speed of the vehicle 12 and the distance to the obstacle, and the display mark determination section 54 determines to display the individual mark in a case in which the obstacle is approaching the vehicle 12 based on this relative speed.

The mark display section 56 displays display marks determined by the display mark determination section 54. Namely, the mark display section 56 displays the predetermined individual mark for any obstacle for which the display mark determination section 54 has determined to display the individual mark. The mark display section 56 also displays the predetermined cluster mark for any obstacles for which the display mark determination section 54 has determined to display the cluster mark.

Furthermore, in the present exemplary embodiment as an example, in a case in which the individual marks and cluster marks are to be displayed in the display region V3 of the third display section 26 (see FIG. 1), the mark display section 56 changes a display format of the marks based on the gaze point of the driver, such that the marks are superimposed on the corresponding obstacles outside the vehicle. For example, the gaze point including the eye height of the driver is detected by a cabin interior camera configuring the sensor unit 46. In a case in which the driver is viewing the display region V3 based on their detected eye position, the mark display section 56 adjusts the display positions of the individual marks and cluster marks such that the positions of the individual marks and cluster marks do not become misaligned with respect to the positions of the corresponding obstacles. The mark display section 56 also changes the shapes of the individual marks and cluster marks as appropriate such that the marks appear as natural three-dimensional images from the perspective of the driver.

The display target setting section 58 sets a display target for displaying the individual marks and cluster marks. Specifically, the display target setting section 58 sets the display target for displaying the individual marks and cluster marks from out of the first display section 24 and the second display section 25 provided to the instrument panel 14, and the third display section 26 set on the windshield glass 18 in FIG. 1.

For example, the display target setting section 58 may set the display target for displaying the individual marks and cluster marks based on driver operation. Alternatively, the display target setting section 58 may automatically change the mark display target according to the situation in which the vehicle 12 is traveling, such that the marks are displayed on the first display section 24 or the second display section 25 in a case in which the vehicle 12 is traveling on an expressway, and the marks are displayed on the third display section 26 in a case in which the vehicle 12 is traveling in an urban area or the like.

Display Examples

Figure 4:
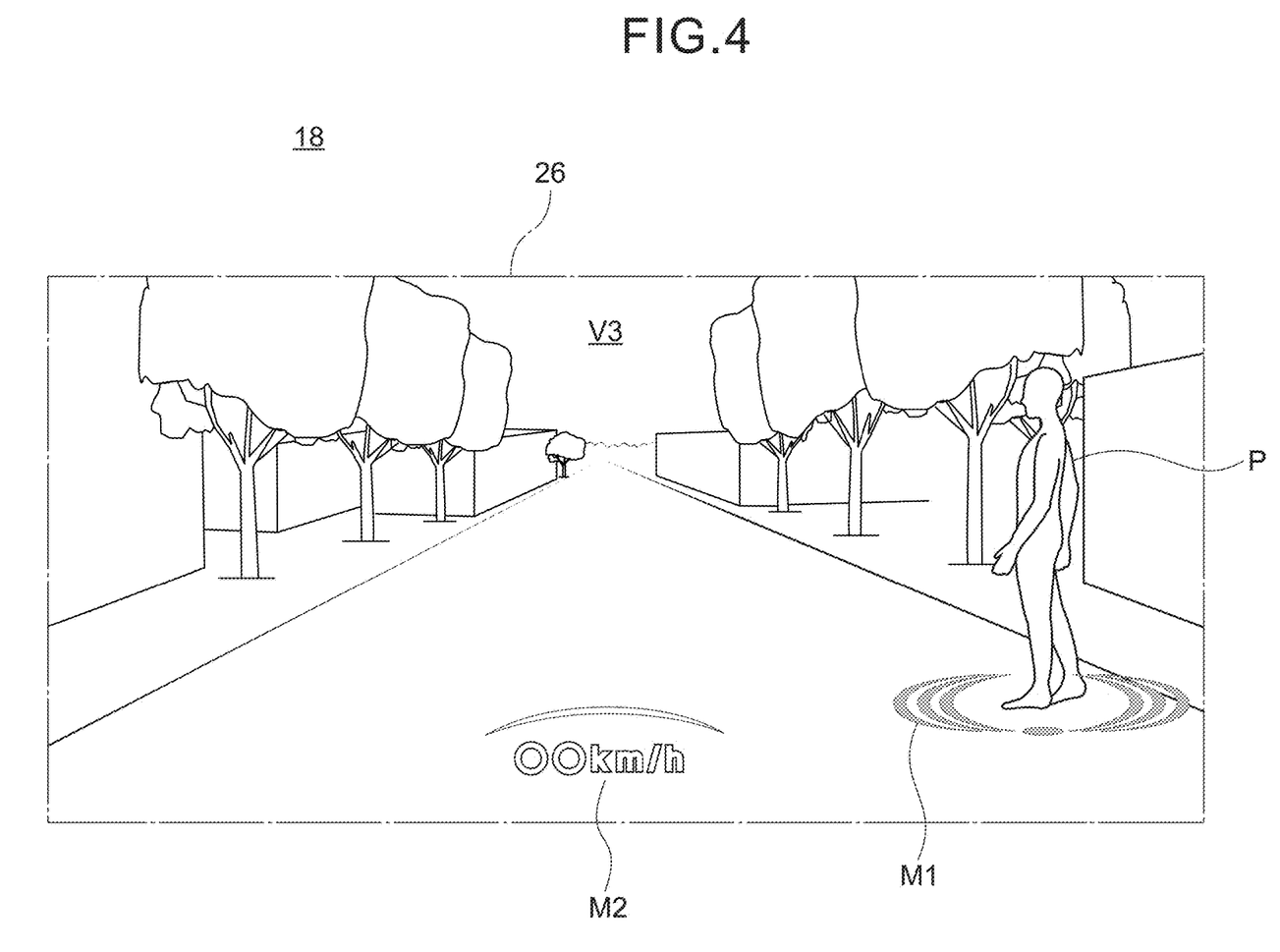
FIG. 4 is a diagram illustrating a display example in which an individual mark is displayed on a display region in an exemplary embodiment.
Figure 5:
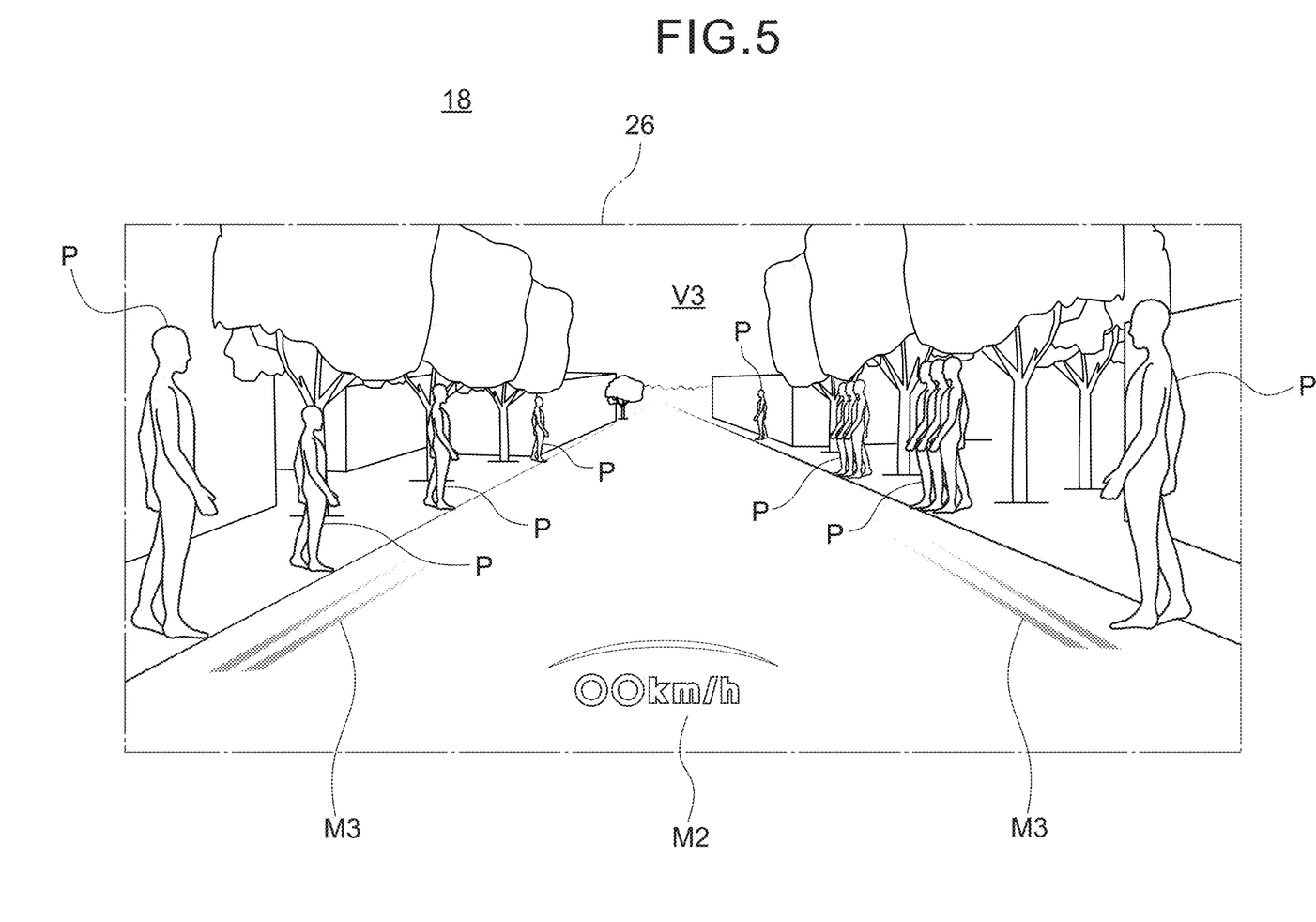
FIG. 5 is a diagram illustrating a display example in which clusters marks are displayed on a display region in an exemplary embodiment.

Next, explanation follows regarding examples of displays displayed in the display region V3 of the third display section 26, with reference to FIG. 4 and FIG. 5.

As illustrated in FIG. 4, the scene ahead of the vehicle through the windshield glass 18 can be seen in the display region V3. Note that although only the scene visible in the display region V3 is illustrated for simplification, the scene ahead of the vehicle does not actually finish at the boundary of the third display section 26.

An individual mark M1 and a vehicle speed mark M2 are displayed in the display region V3 using the head-up display device 44. The individual mark M1 is displayed superimposed on the feet of a pedestrian P serving as an obstacle. In the present exemplary embodiment as an example, the individual mark M1 is displayed as a substantially circular shape. Note that the individual mark M1 may be set such that its color changes according to the distance from the vehicle 12. For example, the individual mark M1 may be displayed in green in a case in which the pedestrian P is more than a predetermined distance from the vehicle 12, whereas the individual mark M1 may be displayed in red in a case in which the pedestrian P is positioned within the predetermined distance from the vehicle 12. The driver is prompted to take caution with respect to an individual obstacle using the individual mark M1 in this manner.

The vehicle speed mark M2 displays the current speed of the vehicle 12 as detected by a non-illustrated vehicle speed sensor.

In FIG. 5, superimposed display of cluster marks M3 is performed instead of the individual mark M1. Each of the cluster marks M3 is displayed as a substantially straight line extending along a vehicle front-rear direction at a position closer to the vehicle 12 than plural pedestrians P. Since plural pedestrians P are present on both the left and right sides of the direction of progress of the vehicle 12 in FIG. 5, the cluster marks M3 are displayed on both the left and right sides, and extend in the vehicle front-rear direction along the road surface from the feet of the pedestrian P closest to the vehicle 12 who serves as a reference.

The cluster mark M3 on the right side is displayed superimposed on a position offset slightly toward the vehicle (the left side) with respect to the feet of the corresponding pedestrian P, and is displayed in a form flowing from the vehicle rear side toward the vehicle front side. The cluster mark M3 on the left side is displayed superimposed on a position offset slightly toward the vehicle (the right side) with respect to the feet of the corresponding pedestrian P, and is displayed in a form flowing from the vehicle rear side toward the vehicle front side. Namely, this superimposed display of the left and right cluster marks M3 makes the driver aware that plural obstacles are present at the outer sides of the left and right cluster marks M3. The driver is prompted to take caution with respect to the plural obstacles using the cluster marks M3 in this manner.

Operation

Next, explanation follows regarding operation of the present exemplary embodiment.

Display Processing

Figure 6:
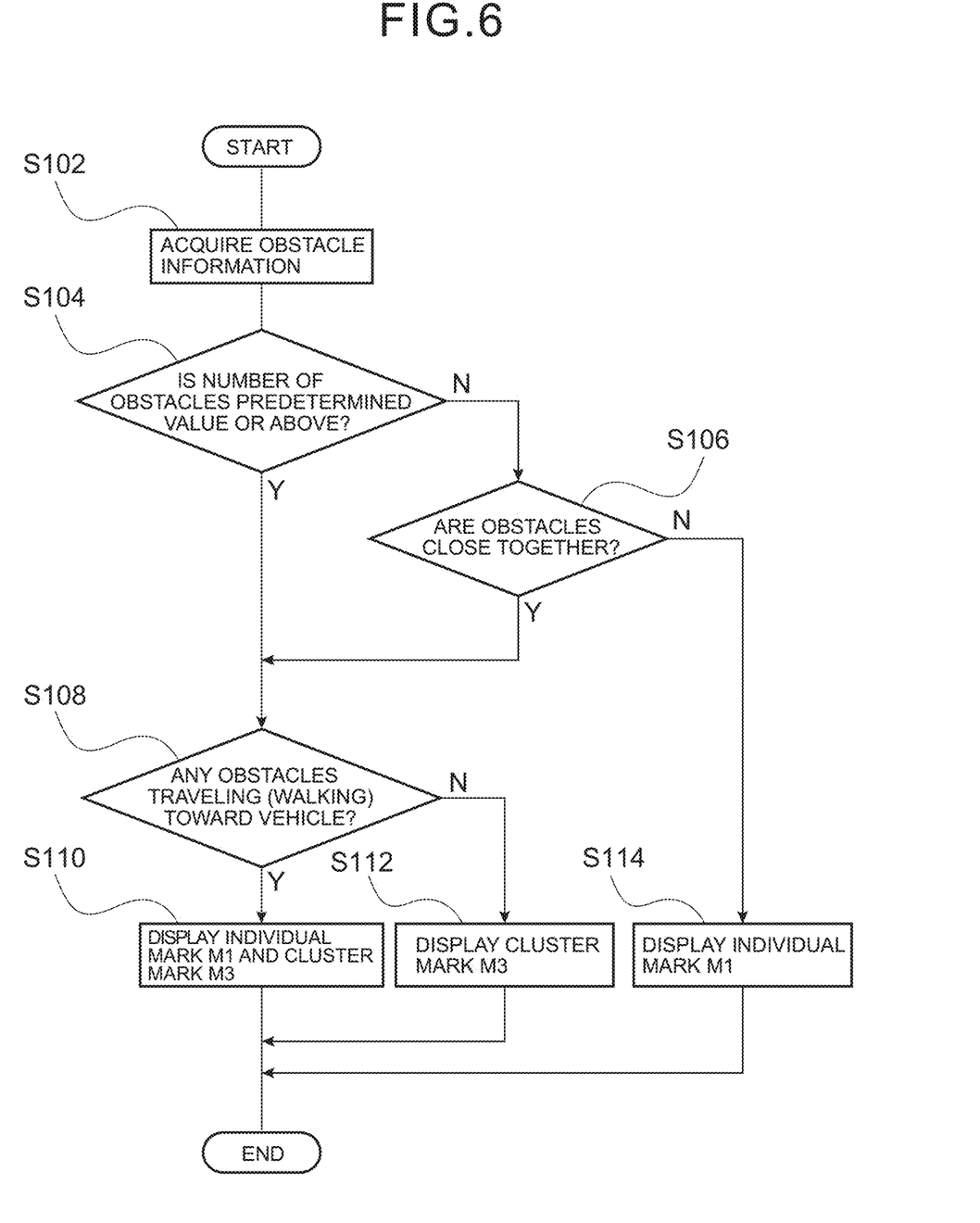
FIG. 6 is a flowchart illustrating an example of a flow of display processing in an exemplary embodiment.

Explanation follows regarding an example of display processing to display at least one of the individual mark M1 or the cluster mark M3 on the third display section 26 configuring the projection surface of the head-up display device 44, with reference to the flowchart illustrated in FIG. 6. The display processing is executed by the CPU 30 reading the display program from the ROM 32 or the storage 36, and expanding and executing the program in the RAM 34. Execution of the display processing is repeated at predetermined intervals.

At step S102, the CPU 30 acquires information regarding obstacles. Specifically, the CPU 30 uses the functionality of the obstacle information acquisition section 52 to acquire information such as the position, type, and movement direction of any obstacles as detected by the sensor unit 46.

At step S104, the CPU 30 determines whether or not the number of obstacles is a predetermined value or above. In the present exemplary embodiment as an example, in a case in which the number of obstacles in any of the three equal sub-regions of the display region V3 is the predetermined value or above, the CPU 30 makes an affirmative determination at step S104 and transitions to the processing of step S108. The processing of step S108 is described in detail later.

In a case in which the number of obstacles in each of the three equal sub-regions of the display region V3 is less than the predetermined value, the CPU 30 makes a negative determination at step S104 and transitions to the processing of step S106. At step S106, the CPU 30 determines whether or not any of the obstacles are close together. In the present exemplary embodiment as an example, in a case in which parts of obstacles ahead of the vehicle appear to overlap one another, the CPU 30 determines that these obstacles are close together and transitions to the processing of step S108.

In a case in which there are no obstacles with overlapping parts at step S106, the CPU 30 transitions to the processing of step S114, and displays the individual mark M1. Specifically, the CPU 30 uses the functionality of the mark display section 56 to display the individual mark M1 superimposed on the corresponding obstacle in the display region V3 (see FIG. 4). The CPU 30 then ends the display processing without displaying any cluster marks M3.

On the other hand, in a case in which an affirmative determination is made at step S104 or step S106, the CPU 30 transitions to the processing of step S108 and determines whether or not there are any obstacles walking or traveling toward the vehicle 12. In a case in which there is an obstacle walking or traveling toward the vehicle 12, the CPU 30 transitions to the processing of step S110.

At step S110, the CPU 30 displays the individual mark M1 and cluster mark M3. Specifically, the CPU 30 uses the functionality of the mark display section 56 to display the cluster mark M3 superimposed on each cluster of plural obstacles in the display region V3 (see FIG. 5). The CPU 30 also displays the individual mark M1 on each of the obstacles walking or traveling toward the vehicle 12. Thus, both the individual mark M1 and cluster mark M3 are displayed in combination in the display region V3 at step S110.

In a case in which determination is made that no obstacles are walking or traveling toward the vehicle 12 at step S108, the CPU 30 transitions to the processing of step S112 and displays the cluster mark M3. Specifically, the CPU 30 uses the functionality of the mark display section 56 to display the cluster mark M3 superimposed on each cluster of obstacles in the display region V3 (see FIG. 5). The CPU 30 then ends the display processing without displaying any individual marks M1.

As described above, in the vehicle display system 10 and the vehicle display device 28 according to the present exemplary embodiment, in a case in which there are plural obstacles, the mark display section 56 displays at least one of the predetermined individual mark M1 or the predetermined cluster mark M3 superimposed on the obstacles in a display region inside the vehicle cabin. This enables the driver to be prompted to take caution with respect to obstacles in the vehicle surroundings.

Moreover, in the present exemplary embodiment, display of either the individual mark M1 or the cluster mark M3 is selected according to the information regarding obstacles, such as the obstacle type and number, thereby enabling any difficulty seeing the obstacles from the perspective of the driver to be suppressed, even in a case in which there are a large number of obstacles.

Furthermore, in the present exemplary embodiment, the cluster mark M3 is displayed in a case in which the number of obstacles is the predetermined value or above, thereby enabling the driver to be rapidly made aware that there are a large number of obstacles. Moreover, displaying the cluster mark M3 for plural obstacles that are close together enables the driver to be made aware of these plural obstacles that are close together as an assembled cluster of obstacles. In particular, in the present exemplary embodiment, displaying the cluster mark M3 in a flowing form enables the driver's attention to be directed toward the obstacles.

Furthermore, in the present exemplary embodiment, displaying the individual mark M1 for an obstacle at a close distance from the vehicle enables the driver to be made aware of an obstacle that requires more caution, even in a case in which there are a large number of obstacles.

Moreover, displaying the individual mark M1 for an obstacle such as a pedestrian walking toward the vehicle 12 or a bicycle traveling toward the vehicle 12 enables the driver to be made aware of obstacles that require more caution, even if the obstacle is at a distance from the vehicle 12.

Furthermore, in the present exemplary embodiment, the individual mark M1 and the cluster mark M3 are displayed in the display region V3 of the third display section 26 by projection using the head-up display device 44, thereby enabling the driver to be made aware of information regarding obstacles without shifting their gaze during driving.

Note that although the cluster mark M3 is displayed in a form flowing from the vehicle rear side to the vehicle front side as illustrated in FIG. 5 in the present exemplary embodiment, there is no limitation thereto. For example, a cluster mark M4 such as that in a first modified example illustrated in FIG. 7 may be adopted.

First Modified Example

Figure 7:
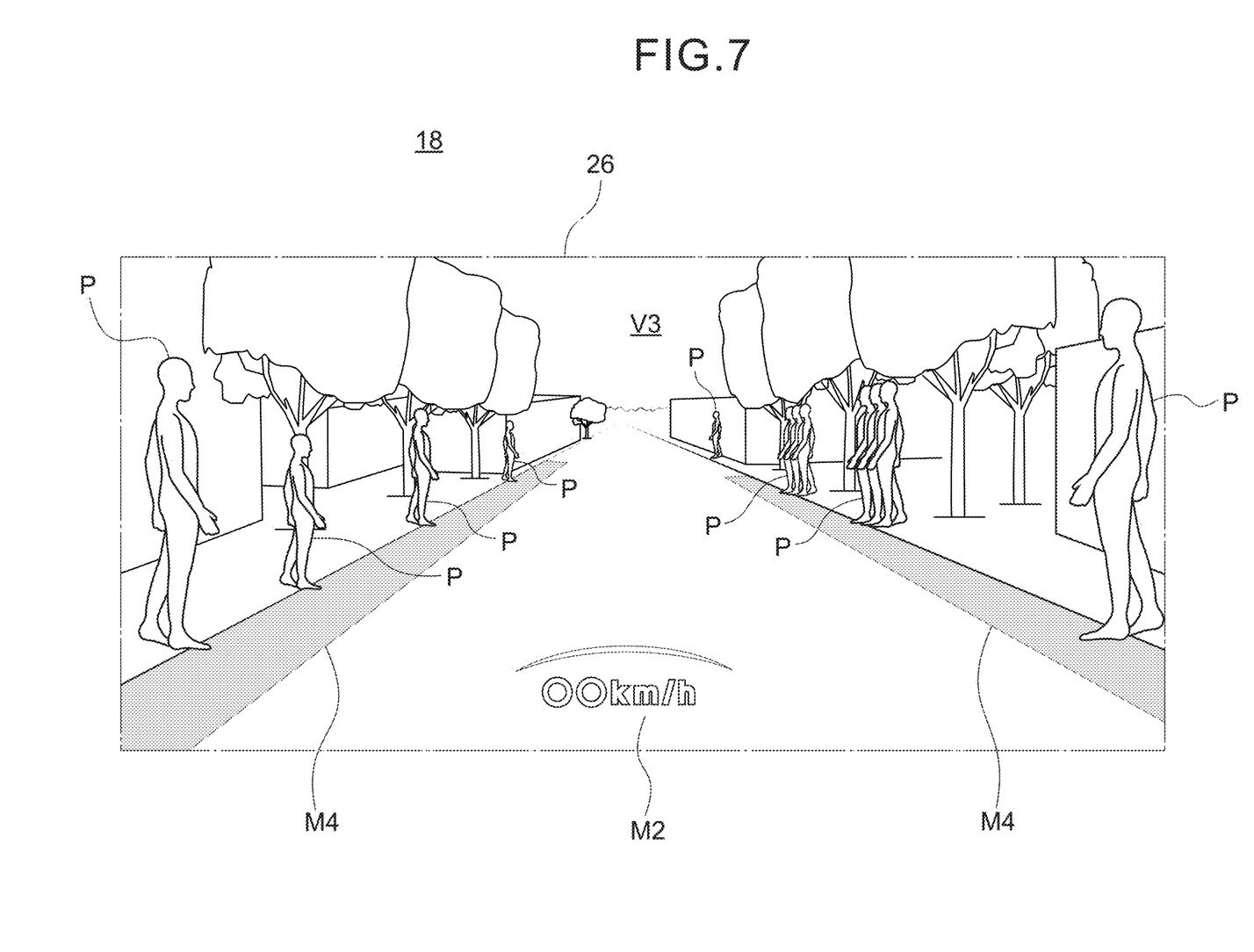
FIG. 7 is a diagram illustrating a display example on a vehicle display device according to a first modified example.

As illustrated in FIG. 7, each of the cluster marks M4 is an elongated band-shaped mark extending along the vehicle front-rear direction. The cluster marks M4 are displayed superimposed on the road surface, and are displayed in a predetermined color.

Note that similarly to the cluster marks M3 in the above exemplary embodiment, each of the cluster marks M4 extends in the vehicle front-rear direction along the road surface from the feet of the pedestrian P closest to the vehicle 12 who serves as a reference.

Since the cluster marks M4 are thus displayed as elongated band shapes in the present modified example, the driver more easily recognizes the regions where the cluster marks M4 are displayed as travel-prohibited regions. Note that similarly to in the above exemplary embodiment, in a case in which there is a pedestrian P approaching the vehicle 12 who is closer than the cluster marks M4, the individual mark M1 is displayed for this pedestrian P so as to prompt the driver to take caution.

Second Modified Example

Figure 8:
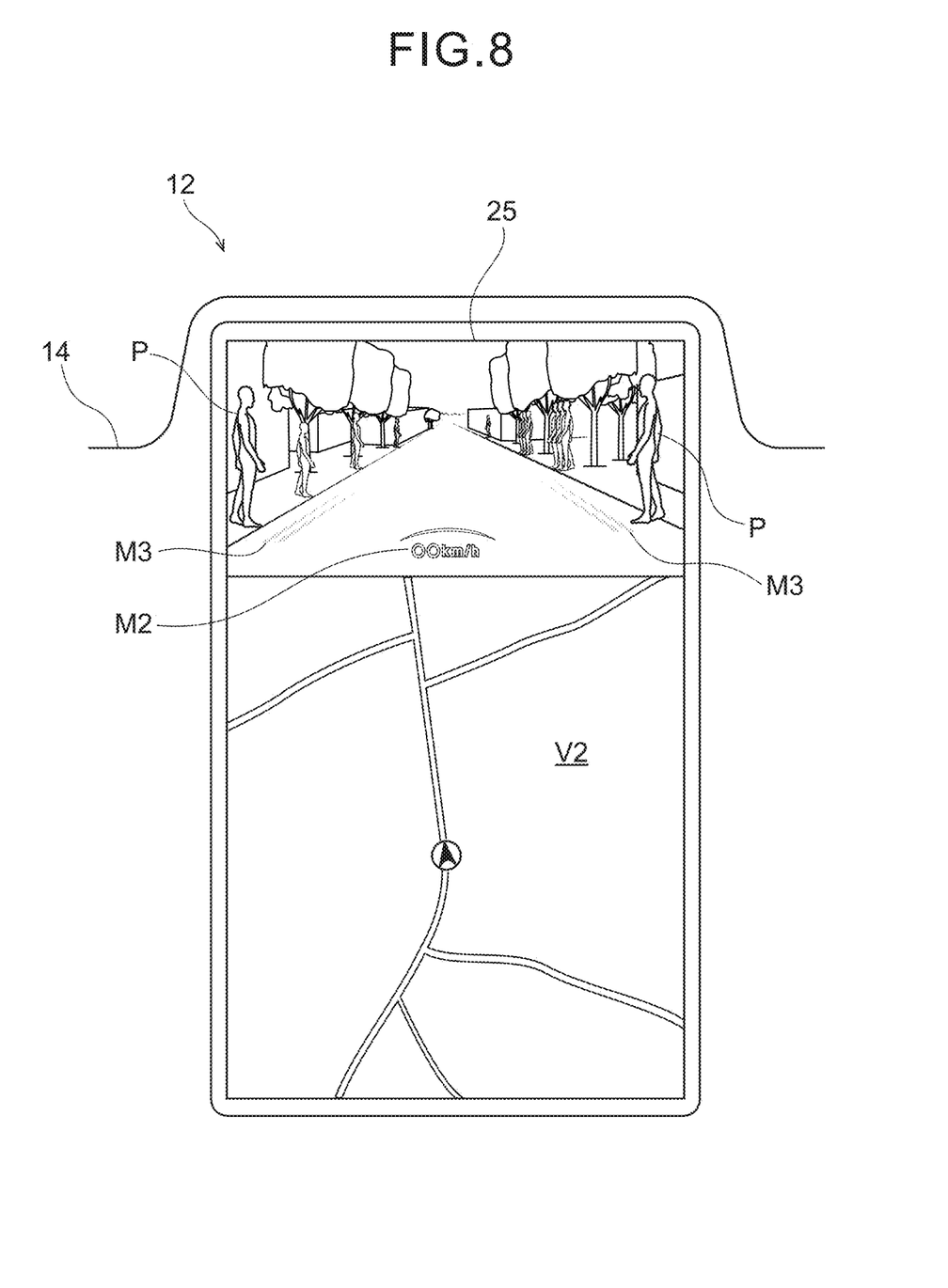
FIG. 8 is a diagram illustrating a display example on a vehicle display device according to a second modified example.

As a second modified example, explanation follows regarding a case in which display is performed in the display region V2 of the second display section 25, with reference to FIG. 8.

As illustrated in FIG. 8, in the present modified example, the display region V2 of the second display section 25 is divided into upper and lower sub-regions. A navigation system screen is displayed in the lower sub-region of the display region V2. For example, the current position of the vehicle 12 and roads in the vehicle surroundings are displayed on the navigation system screen.

An image of ahead of the vehicle is displayed in the upper sub-region of the display region V2. Specifically, an image captured by the front camera configuring the sensor unit 46 is displayed in the display region V2. Cluster marks M3 together with images of pedestrians P are also displayed in the display region V2. Specifically, similarly to in the above exemplary embodiment, substantially straight line shapes are displayed extending along the vehicle front-rear direction at positions closer to the vehicle 12 than the plural pedestrians P. A vehicle speed mark M2 is also displayed in the display region V2.

Thus, in the present modified example, at least one of the individual mark M1 or the cluster mark M3 is displayed on the second display section 25 provided to the instrument panel 14. This enables any irritation felt by the driver toward the individual mark M1 and cluster mark M3 in a state in which their gaze is directed toward the front to be lessened compared to configurations in which the marks are displayed superimposed on actual obstacles.

Although the vehicle display system 10 and the vehicle display device 28 according to an exemplary embodiment have been described above, obviously various modifications may be implemented within a range not departing from the spirit of the present disclosure. For example, although configurations have been described in which the individual marks and cluster marks are displayed on the second display section 25 or the third display section 26 in the above exemplary embodiment, there is no limitation thereto. The individual marks and cluster marks may be displayed on the first display section 24.

Although the individual mark M1 is displayed as a substantially circular shape as illustrated in FIG. 4 in the above exemplary embodiment, there is no limitation thereto. For example, a mark representing an arrow above the head of a pedestrian P may be displayed instead. Furthermore, different individual marks may displayed so as to distinguish between a pedestrian and a bicycle.

Furthermore, although each of the cluster marks M3, M4 is displayed as a straight line shape as illustrated in FIG. 5 and FIG. 7 in the above exemplary embodiment, there is no limitation thereto. As long as the driver can be made aware that a cluster is present, a cluster mark with another shape may be adopted. For example, a cluster mark may be displayed surrounding the plural pedestrians P.

What is claimed is:

1. A vehicle display device comprising:
a processor, the processor being configured to:
acquire information relating to a plurality of obstacles in surroundings of a vehicle;
display a predetermined individual mark prompting caution toward an individual obstacle among the plurality of obstacles by superimposed display in a display region inside a vehicle cabin;
display a predetermined cluster mark prompting caution toward a plurality of the obstacles by superimposed display in the display region;
determine whether any of the plurality of obstacles is walking or traveling toward the vehicle;
determine to display both the cluster mark and the individual mark in a case in which it is determined that the individual obstacle is walking or traveling toward the vehicle;
not display both the cluster mark and the individual mark in a case in which it is determined that the individual obstacle is neither walking nor traveling toward the vehicle;
determine whether a number of the obstacles is a predetermined value or above; and
display the cluster mark while not displaying the individual mark in a case in which it is determined that the number of the obstacles is the predetermined value or above and it is determined that none of the plurality of obstacles is walking or traveling toward the vehicle,
wherein the cluster mark is displayed superimposed on the corresponding obstacles.

2. The vehicle display device of claim 1, wherein the processor is configured to determine to display the cluster mark in a case in which it is determined that the plurality of obstacles are close together based on the acquired obstacle-related information.

3. The vehicle display device of claim 1, wherein the processor is configured to determine to display the individual mark in a case in which a distance between the individual obstacle and the vehicle is a predetermined value or below.

4. The vehicle display device of claim 1, wherein the processor is configured to determine to display the individual mark in a case in which it is determined that the individual obstacle is walking or traveling toward the vehicle.

5. The vehicle display device of claim 1, wherein the processor is configured to determine to display the cluster mark in a case in which it is determined that a number of the obstacles is a predetermined value or above.

6. A vehicle display system comprising:
the vehicle display device of claim 1; and
a display section that is provided inside the vehicle cabin and that includes the display region in which at least one of the individual mark or the cluster mark is displayed.

7. The vehicle display system of claim 6, wherein:
the display region is configured including a region where an image is projected in front of a gaze of a driver using a head-up display device; and
the individual mark is displayed superimposed on the corresponding obstacle.

8. The vehicle display system of claim 6, wherein:
the display region is configured including a display provided at an instrument panel; and
at least one of the individual mark or the cluster mark is displayed on the display together with an image of the corresponding obstacle.

9. A vehicle display method comprising, by a processor:
acquiring information relating to a plurality of obstacles in surroundings of a vehicle;
for the plurality of obstacles, displaying, on a display region inside a vehicle cabin, at least one of a predetermined individual mark prompting caution toward an individual obstacle among the plurality of obstacles or a predetermined cluster mark prompting caution toward a plurality of the obstacles;
determining whether any of the plurality of obstacles is walking or traveling toward the vehicle;

determining to display both the cluster mark and the individual mark in a case in which it is determined that the individual obstacle is walking or traveling toward the vehicle;

not displaying both the cluster mark and the individual mark in a case in which it is determined that the individual obstacle is neither walking nor traveling toward the vehicle;

determining whether a number of the obstacles is a predetermined value or above; and displaying the cluster mark while not displaying the individual mark in a case in which it is determined that the number of the obstacles is the predetermined value or above and it is determined that none of the plurality of obstacles is walking or traveling toward the vehicle, wherein the cluster mark is displayed superimposed on the corresponding obstacles.

10. A non-transitory storage medium storing a program executable by a computer to perform processing comprising:

acquiring information relating to a plurality of obstacles in surroundings of a vehicle;

for the plurality of obstacles, displaying, on a display region inside a vehicle cabin, at least one of a predetermined individual mark prompting caution toward an individual obstacle among the plurality of obstacles or a predetermined cluster mark prompting caution toward a plurality of the obstacles;

determining whether any of the plurality of obstacles is walking or traveling toward the vehicle, determining to display both the cluster mark and the individual mark in a case in which it is determined that the individual obstacle is walking or traveling toward the vehicle;

not displaying both the cluster mark and the individual mark in a case in which it is determined that the individual obstacle is neither walking nor traveling toward the vehicle;

determining whether a number of the obstacles is a predetermined value or above; and displaying the cluster mark while not displaying the individual mark in a case in which it is determined that the number of the obstacles is the predetermined value or above and it is determined that none of the plurality of obstacles is walking or traveling toward the vehicle, wherein the cluster mark is displayed superimposed on the corresponding obstacles.

\* \* \* \* \*